United States Patent [19]

Lawless et al.

[11] Patent Number: 4,545,254

[45] Date of Patent: Oct. 8, 1985

[54] MATERIALS AND METHODS FOR PRESSURE AND TEMPERATURE SENSORS AT CRYOGENIC TEMPERATURES

[75] Inventors: William N. Lawless, Westerville; C. Frederick Clark, Jr., Columbus, both of Ohio

[73] Assignee: CeramPhysics, Inc., Westerville, Ohio

[21] Appl. No.: 616,345

[22] Filed: Jun. 1, 1984

[51] Int. Cl.$^4$ .............................................. G01L 9/12
[52] U.S. Cl. ...................................... 73/714; 73/753; 361/282; 361/283; 374/143; 374/184
[58] Field of Search .................. 361/282, 284, 283; 73/753, 718, 724, 714; 374/143, 184, 142

[56] References Cited

U.S. PATENT DOCUMENTS

| | | | |
|---|---|---|---|
| 2,805,165 | 9/1957 | Goodman | 106/39 |
| 3,649,891 | 3/1972 | Lawless | 361/282 |
| 4,283,752 | 8/1981 | Layton | 361/321 |
| 4,377,840 | 3/1983 | Nair | 361/320 |

FOREIGN PATENT DOCUMENTS 295998 2/1971 U.S.S.R. ............................ 374/143

OTHER PUBLICATIONS

Lawless, "Capacitive Energy Storage at 77K in a Titanate Glass-Ceramic", Proceedings of the XIIIth International Congress of Refrigeration, Washington, DC, 1971, vol. 1, pp. 599-603.
Lawless, "Specific Heats of Lead and Cadmium Niobates at Low Temperatures", Physical Review, vol. 19, No. 7, Apr. 19, 1979, pp. 3755-3760.
Clarke et al., "Quantum-Ferroelectric Pressure Sensor", Ferroelectrics, 1983, vol. 50, pp. 257-262.

Primary Examiner—Donald O. Woodiel
Attorney, Agent, or Firm—Killworth, Gottman, Hagan & Schaeff

[57] ABSTRACT

Capacitive pressure and temperature sensing devices for use at cryogenic temperatures are provided utilizing a quantum ferroelectric pyrochlore ceramic material as the dielectric. The ceramic material has the formula:

$$(Cd_{1-x}M_x)_2(Nb_{1-y}M'_y)_2O_7$$

where M is Pb, Ca, Sr, Ba, or mixtures thereof; where M' is Ta, Sb, or mixtures thereof; and where x and y are numbers in the range of from 0 to 1. M and M' are chosen such that the pressure sensing device uses a ceramic with a nearly temperature independent dielectric constant while the temperature sensing device uses a ceramic with a strongly temperature dependent dielectric constant. The sensors may comprise multi-layered capacitive devices, and may be combined into a single temperature and pressure sensing device.

14 Claims, 10 Drawing Figures

FIG. 4b
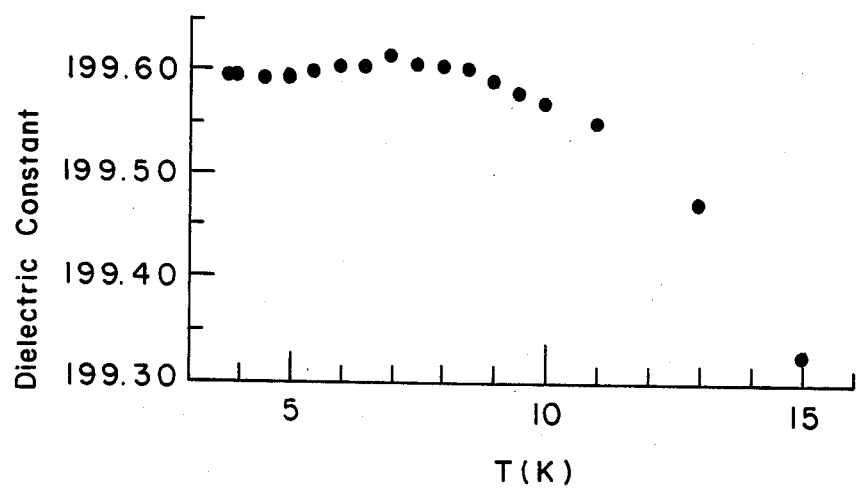
FIG. 6a
FIG. 6b
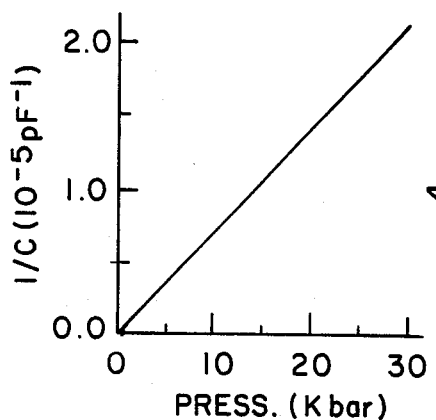
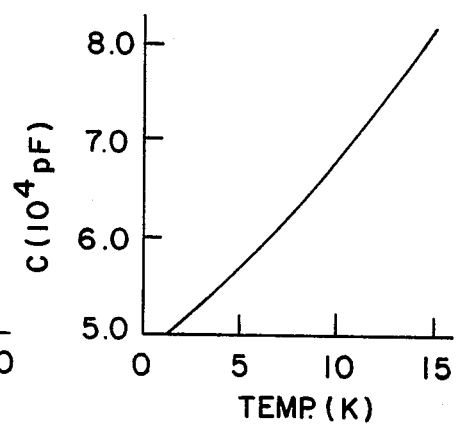

MATERIALS AND METHODS FOR PRESSURE AND TEMPERATURE SENSORS AT CRYOGENIC TEMPERATURES

BACKGROUND OF THE INVENTION

This invention relates to capacitive pressure and temperature sensing devices for use at cryogenic temperatures, and in particular, to the use of quantum ferroelectric ceramic materials in such devices.

Conventional cryogenic devices such as resistance thermometers have several characteristics that degrade their accuracy, make them difficult to use, or both. More recently, work has been done with a class of materials which exhibit the property of quantum ferroelectricity. A typical ferroelectric material has a transition temperature, $T_C$, above which the material is paraelectric and below which it is in an ordered ferroelectric state. If the transition temperature is lowered to near zero degrees (0 K.) Kelvin, then it is possible for quantum fluctuations to suppress the polar ordering. The result is a dielectric constant which is almost temperature independent at low temperatures.

Recent studies have concentrated on crystals of $KTaO_3$ and $SrTiO_3$ and associated solid solutions of these compounds which exhibit quantum ferroelectric behavior at temperatures near 0 K. It is known that the transition temperature in these crystals can be changed by substitution of small amounts of different ions in the compound. For example, niobium can be substituted for tantalum in $KTaO_3$.

While these materials have been demonstrated to be suitable for use as cryogenic thermometers, see, for example, Lawless U.S. Pat. No. 3,649,891, neither of these compounds would be suitable for a pressure sensor. Ceramics in the $KTaO_3$ system have uncontrollable losses of $K_2O$ during ceramic formation, and single crystals of the material are prohibitively expensive. The $SrTiO_3$ ceramics suffer from two disadvantages. These are that required refractory ceraming temperatures in the range of approximately 1500° C. lead to irreproducibilities and loss of dopant or substitutional ions and, more seriously, the quantum ferroelectric behavior appears limited to the temperature range of less than 4 K.

Accordingly, there is a need in the art for capacitive pressure and temperature sensing devices and materials which are operable over a wider range of temperatures near 0 K.

SUMMARY OF THE INVENTION

The present invention provides capacitive pressure and temperature sensing devices utilizing ferroelectric pyrochlore ceramic materials having the general structure $A_2B_2O_7$. By making substitutions on either the A site, the B site, or both the A and B sites, these ferroelectric materials can be induced to exhibit quantum ferroelectric behavior at temperatures in the range of from 0 to 15 K.

The ceramic materials of the present invention have the general formula:

$$(Cd_{1-x}M_x)_2(Nb_{1-y}M'_y)_2O_7$$

where x and y are numbers in the range of from 0 to 1, where M is selected from the group consisting of Pb, Ca, Sr, Ba, and mixtures thereof; and where M' is selected from the group consisting of Ta, Sb, and mixtures thereof. The substituted ions M and M' are chosen such that the pressure sensing device of the present invention uses a ceramic composition having a nearly temperature independent dielectric constant, at low temperatures whereas the temperature sensing device of the present invention uses a ceramic composition having a strongly temperature dependent dielectric constant at low temperatures. In a preferred embodiment of the invention, the two sensors can be combined in a single multi-layer capacitive device.

We have determined that making atomic substitutions in the general pyrochlore structure lowers the transition temperature, $T_c$, and causes the materials to exhibit quantum ferroelectric properties at low temperatures. For example, some of the materials of the present invention exhibit nearly temperature independent dielectric constants in the range of from 0 to above 10 K. Such materials are suitable for use as pressure sensing devices. Likewise, by selectively substituting at the A and/or B sites in the general $A_2B_2O_7$ structure, some of the materials of the present invention have very large temperature sensitivities (i.e., changes in dielectric constant) at low temperatures. These materials are suitable for use as temperature sensing devices.

Accordingly, it is an object of the present invention to provide capacitive pressure and temperature sensing devices for use at cryogenic temperatures. This and other objects and advantages of the invention will be apparent from the following detailed description, the accompanying drawings, and the appended claims.

BRIEF DESCRIPTION OF THE DRAWINGS

FIGS. 4a and 4b are graphs of dielectric constant versus temperature for compositions of the formula $(Cd_{0.9}Pb_{0.1})_2Nb_2O_7$ and $(Cd_{0.4}Pb_{0.6})_2(Nb_{0.5}Ta_{0.5})_2O_7$, respectively.

FIGS. 6a and 6b are graphs of inverse capacitance versus pressure and capacitance versus temperature, respectively, for a combined temperature and pressure sensing device in accordance with the practice of the present invention.

DETAILED DESCRIPTION OF THE PREFERRED EMBODIMENTS

The pressure dependence and sensitivity of the dielectric constants of the compositions of the present invention may be seen from the Clausius-Mossotti formula as given by Bosman and Havinga, *Phys. Rev.*, Vol. 129, p. 1593 (1963), $$\left(\frac{\partial \epsilon}{\partial p}\right)_T = (\tfrac{1}{3})(\epsilon - 1)(\epsilon + 2)\beta\left(\frac{\partial \ln \alpha}{\partial \ln V} - 1\right)$$

where $\beta$ is the compressibility and $\alpha$ is the polarizability of a small macroscopic sphere of volume V, and where $\epsilon$ is the dielectric constant of the material. For dielectric constants having values much greater than 1, $$\left(\frac{\partial \epsilon}{\partial p}\right)_T = M\epsilon^2$$

where $$M = (\tfrac{1}{3})\beta\left(\frac{\partial \ln \alpha}{\partial \ln V} - 1\right)$$

Equivalently:

$$\left(\frac{\partial (1/\epsilon)}{\partial p}\right)_T = -M$$

The pyrochlore ferroelectric ceramic materials of the present invention have the general chemical structure $A_2B_2O_7$. We have found that by making atomic substitutions in the general $A_2B_2O_7$ structure lowers the transition temperature, $T_c$, of the compositions and, at low temperatures, causes the compositions to exhibit quantum ferroelectric behavior.

Figure 1:
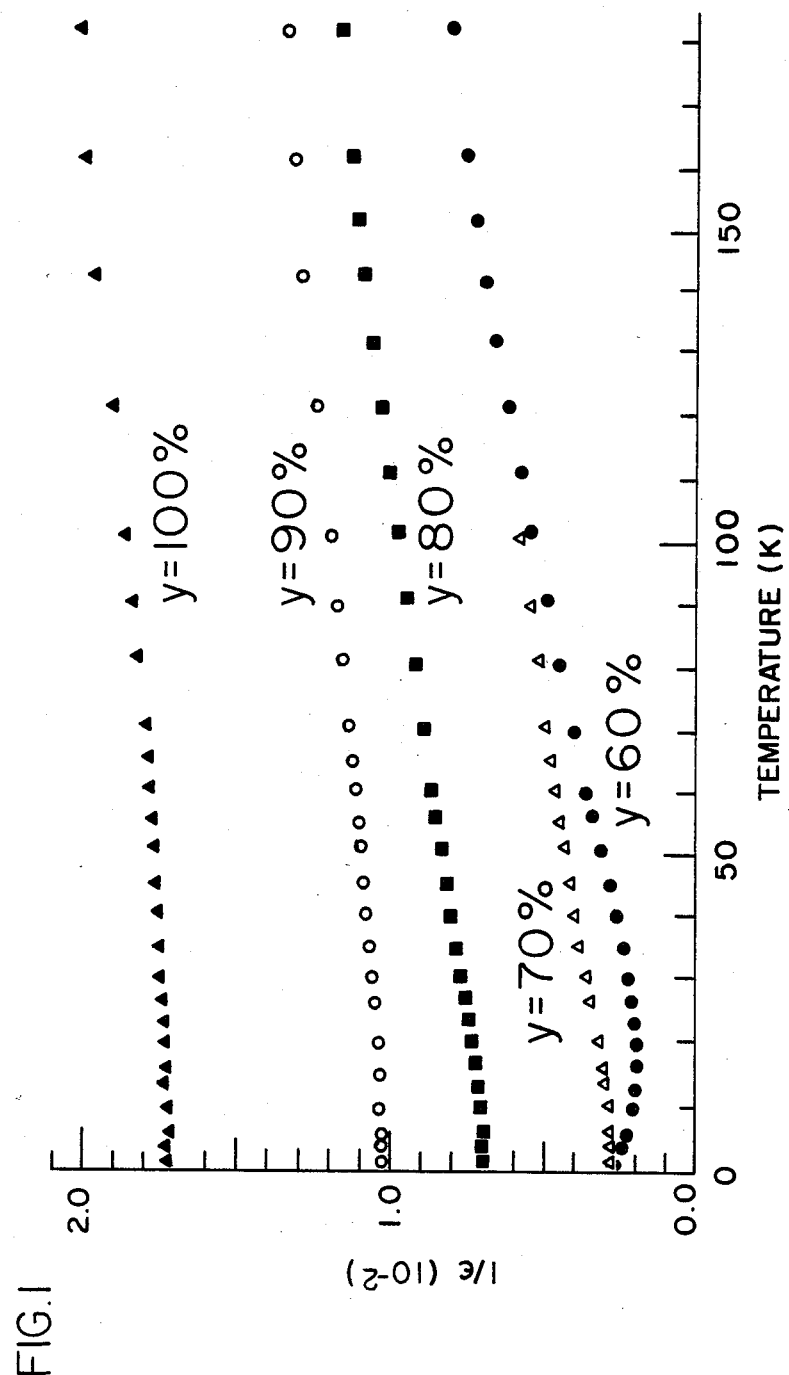
FIG. 1 is a graph of inverse dielectric constant versus temperature for several compositions of the general formula $Cd_2(Nb_{1-y}Ta_y)_2O_7$.
Figure 2A:
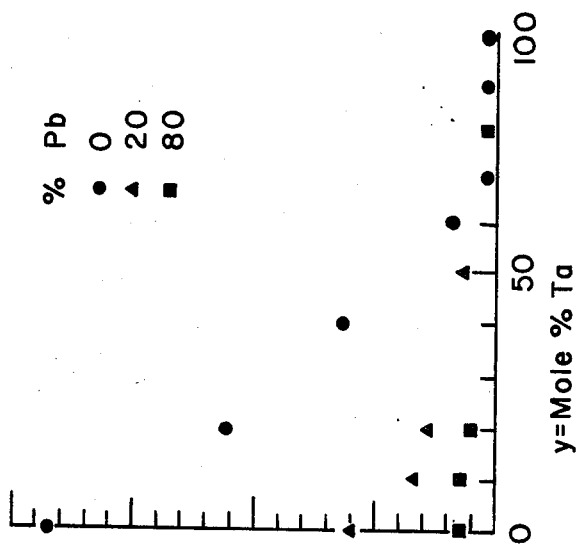
FIGS. 2a and 2b are graphs of transition temperature versus mole percent of Pb or Ta in compositions of the general formula $(Cd_{1-x}Pb_x)_2(Nb_{1-y}Ta_y)_2O_7$.
Figure 2B:
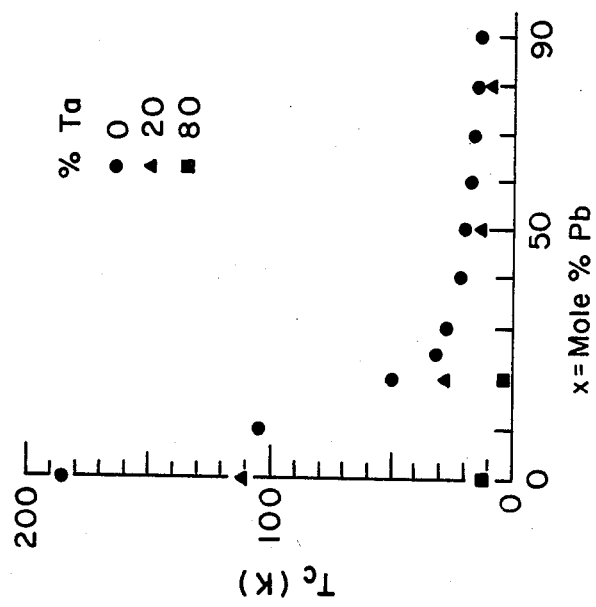

The quantum ferroelectric behavior of compositions of the present invention are illustrated in FIG. 1 utilizing a group of the compositions having the general formula $Cd_2(Nb_{1-y}Ta_y)_2O_7$. As shown, increasing the value of y lowers the transition temperature and flattens the dielectric constant at low temperatures. The lowering of the transition temperatures of compositions of the present invention are also illustrated in FIGS. 2a and 2b for compounds having the general formula $(Cd_{1-x}Pb_x)_2(Nb_{1-y}Ta_y)_2O_7$. In general, we have found for this group of compositions that increasing the mole percent of substitutional ions such as Pb at the A site and/or increasing the mole percent of substitutional ions such as Ta at the B site decrease the transition temperature, $T_c$, of the composition.

The compositions of the present invention may be made utilizing methods which are known in the art. For example, ceramic powders of CdO, $Nb_2O_5$, PbO, and $Ta_2O_5$ may be mixed in appropriate ratios by ball-milling in water or alcohol and then dried. The mixed, dried powders may then be calcined at about 900° C., and remilled following calcination. These reacted powders are then sintered at from 1200° to 1400° C. for 1 hour into the desired shapes.

For example, the ceramic compositions of the present invention can be formed into a multi-layered ceramic capacitor structure utilizing tape casting techniques known in the art. "Tape casting" refers to the known procedures for forming a multi-layered body having appropriate metal electrodes interdispersed between ceramic layers. Such ceramic layers may be formed by mixing powdered ceramic material with an appropriate organic binder and preparing a thin film sheet. The sheets may be stacked and pressed in a known manner followed by binder burn out and sintering.

For a typical procedure, the calcined ceramic powders of the present invention may be cast into sheets having a thickness of approximately 0.001 to 0.010 inches using any of any several available organic binders. After stacking with appropriate, silkscreened electrode patterns, the stacks may be pressed and fired according to the following schedule: The organic binder may be burned out at 400° to 500° C. for 1 to 5 hours, followed by sintering of the sheets at 1200° to 1400° C. for from 1 to 24 hours. Optionally, pressure may be applied to the sheets during the sintering step.

Figure 3:
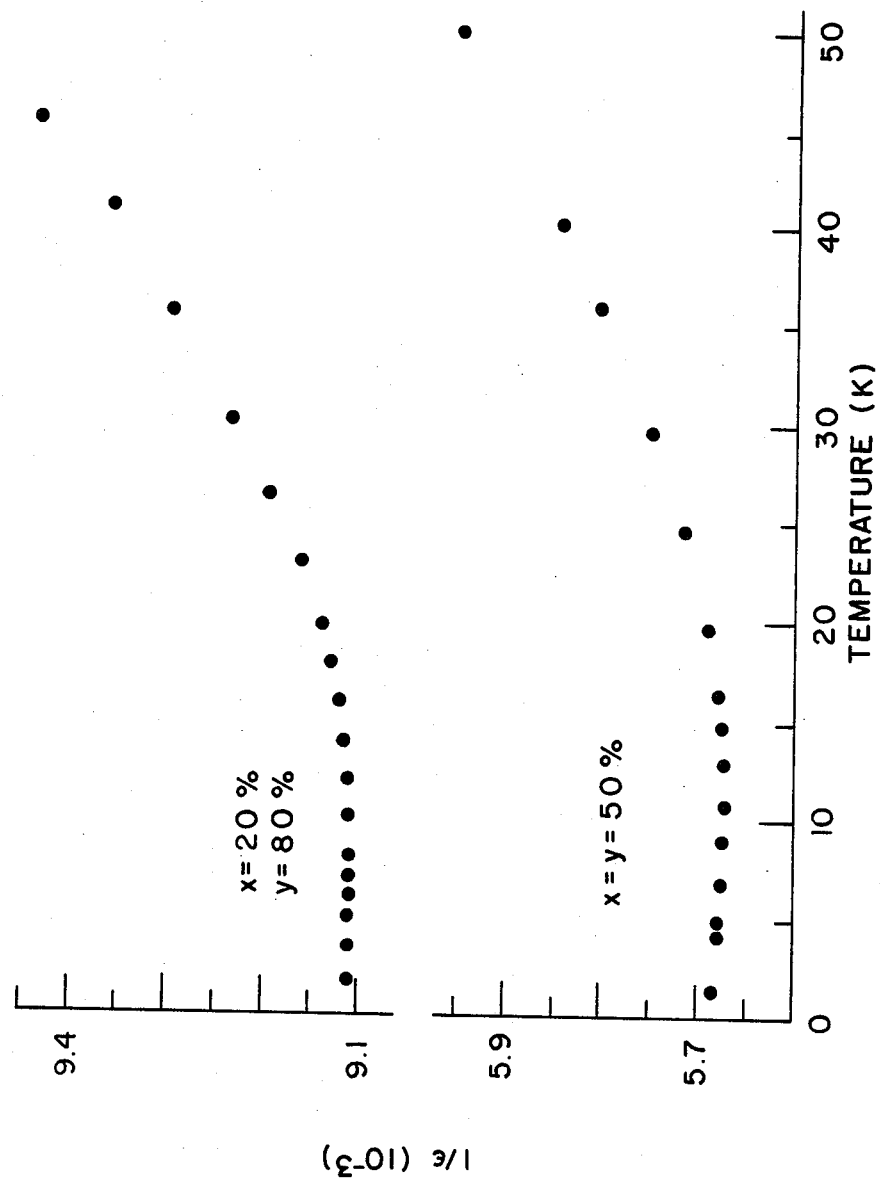
FIG. 3 is a graph of inverse dielectric constant versus temperature for two compositions of the general formula $(Cd_{1-x}Pb_x)_2(Nb_{1-y}Ta_y)_2O_7$.

FIG. 3 illustrates the low temperature properties of two of the preferred compounds of the present invention. FIG. 3 illustrates the flatness of the inverse of dielectric constant versus temperature for two of the compositions in the cadmium niobate system (x=0.2, y=0.8 and x=y=0.5). As can be seen, both of these materials have a nearly temperature independent region which extends above 10 K. Both of these materials are suitable for use as the dielectric layers in a pressure sensing device.

Likewise, FIG. 4b illustrates the flatness of dielectric constant versus temperature for another composition in the cadmium niobate system (x=0.6, and y=0.5). As can be seen, over the temperature range of 0 to 15 K., the dielectric constant of the compound varies only by a value of 0.3.

For the cadmium niobate system, the maximum dielectric constant at the transition temperature is lowered as the x and y values for the substituted ions increase. However, the dielectric constant of such compositions of the present invention remains high enough for a pressure sensor to have a large pressure sensitivity in accordance with the Clausius-Mossotti equation given above. The selection criteria for the best materials for a pressure sensor not only take into account the flatness over as large a temperature range as possible, but also include keeping the dielectric constant as large as possible and keeping the substituted ion content, such as Ta, as low as possible. The dielectric constant should be kept as high as possible in order to maximize pressure sensitivity while keeping substituted ion concentration low to enable ceramic sintering temperatures to remain low also. While certain preferred compositions have been disclosed for purposes of illustration, it will be apparent to those skilled in the art that other ions within the scope of this invention may be substituted and other values for x and y within the overall general formula of the ceramic materials of the present invention may also be made. Most desirably, the values of M, M', x and y are chosen such that the dielectric constant of the ceramic material is essentially temperature independent below 15 K. for use in a pressure sensing device.

Figure 4A:
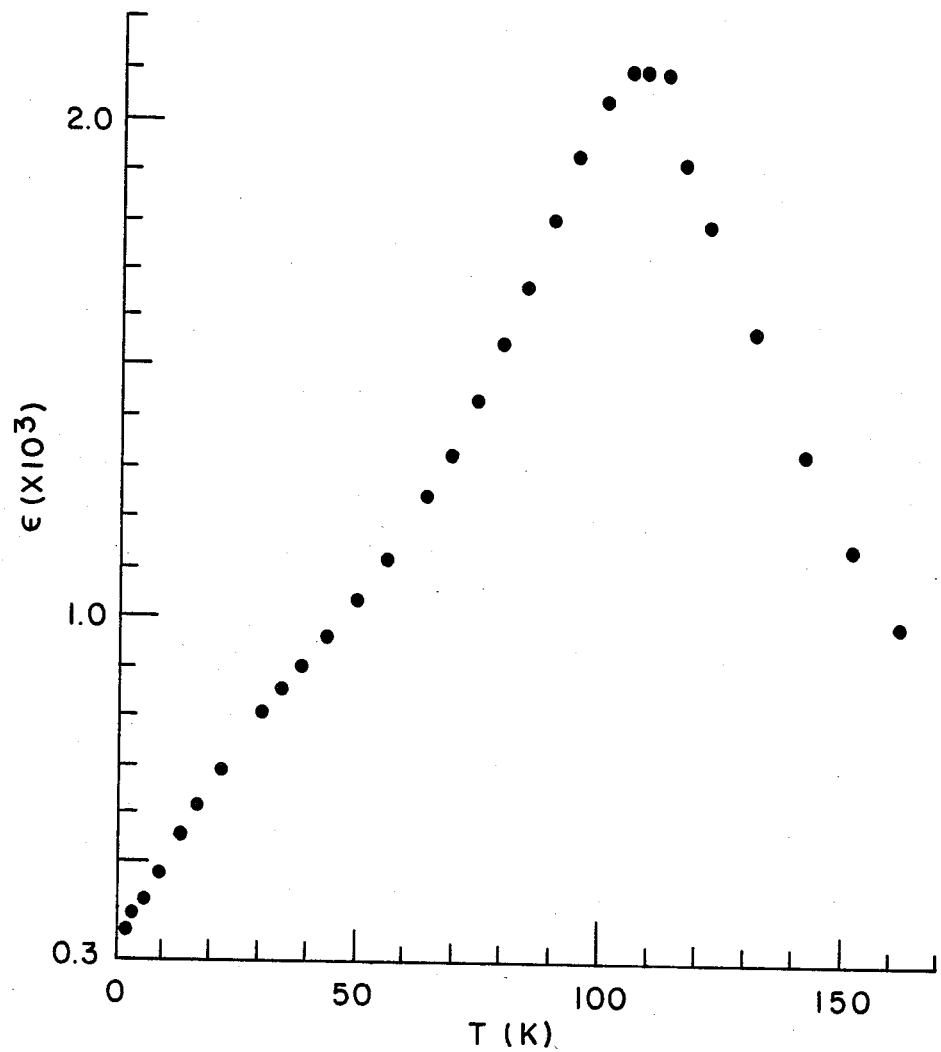

FIG. 4a illustrates a material in the cadmium niobate system (x=0.1 and y=0) which possesses a large temperature sensitivity at low temperatures. As can be seen from FIG. 4a, the dielectric constant of that composition varies proportionally to temperature in the range of from approximately 0 to above 50 K. Such a material, which has a large temperature sensitivity, is useful as the ceramic layer or layers in a temperature sensing device. While certain compositions have been illustrated, it will be apparent to those skilled in the art that the values of M, M', x and y may be chosen so that the dielectric constant of the ceramic composition varies proportionally with temperature in the temperature range of interest, namely, from approximately 0 to 15 K.

A typical capacitor structure utilizing the ceramic materials of the present invention is illustrated in FIG.

Figure 5A:
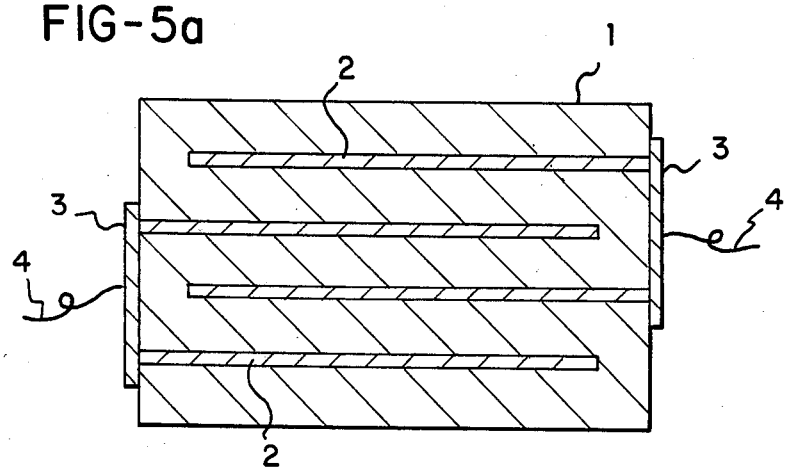
FIG. 5a is a schematic diagram of a typical structure which may be utilized as a pressure and/or temperature sensing device in the practice of the present invention.

5a. This structure may be utilized as either a pressure or temperature sensing device depending upon the particular ceramic composition chosen for the dielectric layers. The multi-layer capactive device comprises ceramic layers 1 with interleafing metal electrodes 2. Electroding metal caps 3 make electrical contact to electrodes 2 and hook up wires 4. While the device illustrated in FIG. 5a is shown with only a few layers for simplicity and ease of understanding, it will be apparent to those skilled in the art that many more layers may be built up in accordance with the teachings of this invention to form more complex multi-layered capacitive devices.

Figure 5B:
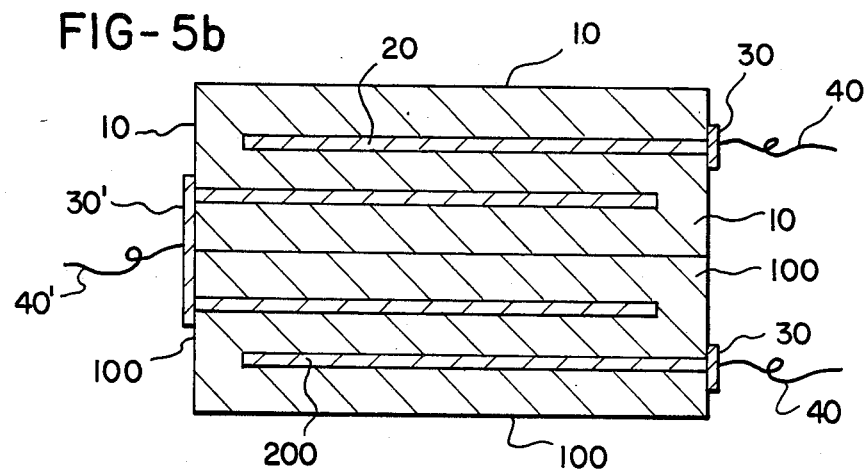
FIG. 5b is a schematic diagram of a combination temperature and pressure and sensing device in the practice of the present invention.

FIG. 5b illustrates a two section device which is combined into both a pressure and temperature sensing device where one section is the pressure sensor and the other is the temperature sensor. Since both sections are made from very similar materials, there is no problem with thermal contraction mismatches.

A multi-layer capacitive device in accordance with the present invention comprises ceramic layers 10 and 100 with interleafing pairs of metal electrodes 20 and 200. For purposes of illustration, it is assumed that the compositions of ceramic layers 10 are chosen to be the pressure sensor part of the device and that the compositions of ceramic layers 100 are chosen to be the temperature sensing portion of the device. Electroding metal caps 30 and 30' make electrical contacts with the electrodes 20 and 200. As illustrated, the combined device has a common lead 40' connected to electroding metal cap 30' and separate leads 40 from electroding metal caps 30. While the device illustrated in FIG. 5b is shown with only a few layers for simplicity and ease of understanding, it will be apparent to those skilled in the art that many more layers may be built up in accordance with these teachings to form more complex multi-layered devices.

For purposes of illustration, the material $(Cd_{0.5}Pb_{0.5})_2(Nb_{0.5}Ta_{0.5})_2O_7$ which is illustrated in FIG. 3 may be used for the dielectric material for the pressure sensing portion and the material $(Cd_{0.9}Pb_{0.1})_2Nb_2O_7$ which is illustrated in FIG. 4a may be used for the temperature sensing portion of a combined pressure-temperature sensing device. Such a device would have multiple layers of the appropriate ceramic material as the respective temperature and pressure sensing portions of the device. In a preferred structure, each portion would have 66 layers. For these ceramic materials, the pressure sensing portion of the device would have a capacitance of approximately 29 nF at low temperatures with a maximum variation in capacitance of 19 pF between 4 K. and 15 K. Assuming that the value of M in the Clausius-Mossotti equation above is taken as $-10^{-4}(kbars)^{-1}$, the sensitivity for the pressure sensing portion of the device would be as shown in FIG. 6a. Capacitance versus temperature for the temperature sensing portion of the device is illustrated in FIG. 6b. The pressure sensitivity of the device would be 2.0 to 2.5 nF/Kb over the temperature range of 4 to 15 K.

The device is used to make a pressure and a temperature measurement at low temperatures as follows: Assuming that the pressure is unknown and the temperature is known to be somewhere in the range of 4 to 15 K., then one capacitance measurement is made on each respective sensor section. The only uncertainty in the pressure measurement is due to a slight variation of the inverse of dielectric constant versus temperature in the ceramic material. For the illustrated device, ΔC, the change in capacitance, is 19 pF which implies a change in pressure ΔP of 0.047 kbars. With this uncertainty in the pressure, the capacitance measurement on the temperature sensor portion of the device will determine the temperature to within a ΔT of approximately 0.1 K. After this capacitance measurement is taken, the temperature is now approximately known to within 0.1 K., and the pressure may be determined to a Δp of approximately 0.0025 bars. Further mathematical iterations can be utilized to reduce the uncertainty of the reading error of the original capacitance measurements to obtain accurate pressure and temperature measurements utilizing the combined temperature and sensing device of the present invention.

While the apparatus herein described constitutes preferred embodiments of the invention, it is to be understood that the invention is not limited to these precise apparatuses, and that changes may be made without departing from the scope of the invention, which is defined in the appended claims.

What is claimed is:

1. A capacitive pressure sensing device for use at cryogenic temperatures comprising first and second electrodes having a layer of dielectric material therebetween, said dielectric material consisting essentially of a pyrochlore ferroelectric ceramic having the formula:

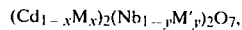

$(Cd_{1-x}M_x)_2(Nb_{1-y}M'_y)_2O_7,$ where x and y are numbers in the range of from 0 to 1, M is selected from the group consisting of Pb, Ca, Sr, Ba, and mixtures thereof, and M' is selected from the group consisting of Ta, Sb, and mixtures thereof.

2. The capacitive pressure sensing device of claim 1 in which M, M', x, and y are chosen such that the dielectric constant of said ceramic is essentially temperature independent below 15 K.

3. The capacitive pressure sensing device of claim 1 in which M is Pb and M' is Ta.

4. The capacitive pressure sensing device of claim 3 in which x is 0.2 and y is 0.8.

5. The capacitive pressure sensing device of claim 3 in which x is 0.6 and y is 0.5.

6. The capacitive pressure sensing device of claim 3 in which x is 0.5 and y is 0.5.

7. A capacitive temperature sensing device for use at cryogenic temperatures comprising first and second electrodes having a layer of dielectric material therebetween, said dielectric material consisting essentially of a pyrochlore ferroelectric ceramic having the formula:

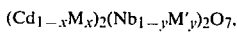

$(Cd_{1-x}M_x)_2(Nb_{1-y}M'_y)_2O_7,$ where x and y are numbers in the range of from 0 to 1, M is selected from the group consisting of Pb, Ca, Sr, Ba, and mixtures thereof, and M' is selected from the group consisting of Ta, Sb, and mixtures thereof.

8. The capacitive temperature sensing device of claim 7 in which M, M', x and y are chosen such that the dielectric constant of said ceramic varies proportionally with temperature in the range of 0 to 15 K.

9. The capacitive temperature sensing device of claim 7 in which M is Pb and M' is Ta.

10. The capacitive temperature sensing device of claim 9 in which x is 0.1 and y is 0.

11. A combination pressure and temperature sensing device for use at cryogenic temperatures comprising first and second pairs of electrodes having first and second layers of dielectric material therebetween, respectively, said dielectric material consisting essentially of pyrochlore ferroelectric ceramic having the formula:

$$(Cd_{1-x}M_x)_2(Nb_{1-y}M'_y)_2O_7,$$

wherein x and y are numbers in the range of from 0 to 1, M is selected from the group consisting of Pb, Ca, Sr, Ba, and mixtures thereof, and M' is selected from the group consisting of Ta, Sb, and mixtures thereof, said first pair of electrodes and said first layer of dielectric material therebetween forming the pressure sensing portion of said device and wherein M, M', x and y are chosen such that the dielectric constant of said first layer of dielectric material is essentially temperature independent below 15 K., and said second pair of electrodes and said second layer of dielectric material therebetween forming the temperature sensing portion of said device, and wherein M, M', x, and y are chosen such that the dielectric constant of said second layer of dielectric material varies proportionally with temperature in the range of 0 to 15 K.

12. The combination pressure and temperature sensing device of claim 11 in which M is Pb and M' is Ta.

13. The combination pressure and temperature sensing device of claim 12 in which for said first layer of dielectric material, x is 0.6 and y is 0.5.

14. The combination pressure and temperature sensing device of claim 12 in which for said second layer of dielectric material, x is 0.1 and y is 0.

* * * * *